United States Patent

Schweiger

[15] 3,637,520

[45] Jan. 25, 1972

[54] SOLVENT-SOLUBLE QUATERNARY AMMONIUM SALTS OF CELLULOSE SULFATE

[72] Inventor: Richard G. Schweiger, Muscatine, Iowa

[73] Assignee: Kelso Company, San Diego, Calif.

[22] Filed: Sept. 25, 1969

[21] Appl. No.: 861,156

Related U.S. Application Data

[63] Continuation-in-part of Ser. No. 772,814, Nov. 1, 1968, abandoned, which is a continuation-in-part of Ser. No. 615,337, Feb. 13, 1967, abandoned.

[52] U.S. Cl. ............................252/316, 106/190, 106/191, 260/215
[51] Int. Cl. ...........................................................C08b 5/14
[58] Field of Search.................260/215; 252/316; 106/190, 106/191

[56] References Cited

UNITED STATES PATENTS

| | | | |
|---|---|---|---|
| 2,931,753 | 4/1960 | Chesbro et al. | 424/180 |
| 3,337,531 | 8/1967 | Wakeman et al. | 260/215 |
| 3,361,792 | 1/1968 | Wakeman et al. | 260/501.11 |
| 3,368,484 | 2/1968 | Fairchild | 260/215 |
| 3,377,382 | 4/1968 | Elmquist | 260/567.6 |
| 3,387,954 | 6/1968 | Capowski et al. | 44/72 |
| 3,435,039 | 3/1969 | wakeman et al. | 260/286 |

*Primary Examiner*—Donald E. Czaja
*Assistant Examiner*—Ronald W. Griffin
*Attorney*—Elwood S. Kendrick, Thomas H. Jones and Kendrick and Subkow

[57] ABSTRACT

Quaternary ammonium salts of a colloidal cellulose sulfate having a degree of substitution of at least about two and method of making by adding a water-soluble salt of the colloidal cellulose sulfate to water, then adding a quaternary ammonium salt and optionally a lower alcohol. The resulting products are soluble in many organic solvents.

As described in my prior U.S. Pat. application Ser. No. 467,738, the essentially undegraded cellulose sulfate employed as a reactant according to the present invention has a viscosity in a 1 percent aqueous solution in excess of 20 cps. and preferably in excess of 100 cps. as measured with a Brookfield Synchro Electric Viscometer Model LVF at 60 r.p.m. and 25° C., and a number of these cellulose sulfates have a viscosity in a 1 percent aqueous solution in excess of 100 cps. The cellulose sulfates employed as reactants according to the present invention and as described in U.S. application Ser. No. 467,738 are further characterized by their reactivity with potassium ions in aqueous media to form a thermoreversible gel.

51 Claims, No Drawings

SOLVENT-SOLUBLE QUATERNARY AMMONIUM SALTS OF CELLULOSE SULFATE

This application is a continuation-in-part of my prior copending application Ser. No. 772,814, filed Nov. 1, 1968, now abandoned, which is in turn a continuation-in-part of my prior application Ser. No. 615,337 filed Feb. 13, 1967, now abandoned.

This invention pertains to novel derivatives of cellulose sulfate. More specifically, the invention relates to novel derivatives of cellulose sulfate which are soluble in various organic solvents and, therefore, are useful in the preparation of thickened and gelled organic liquids.

As described in my earlier U.S. patent application Ser. No. 467,738 filed June 28, 1965, I have discovered novel cellulose sulfates in which the structure of the cellulose remains relatively undegraded, and the end products thereby exhibit colloidal properties with the desired degree of sulfate substitution. Further, in my earlier application, I disclosed a method for preparing sulfate esters of cellulose in which the cellulose structure remains relatively undegraded. The subject matter of my prior application is incorporated herein by reference.

The colloidal cellulose sulfates disclosed in my prior application are admirably suited for forming thermally reversible aqueous gels with certain cations, notably potassium. However, due to the structure of cellulose sulfate, my colloidal cellulose sulfates are not soluble in various organic hydrocarbon solvents and chlorinated hydrocarbon solvents. Thus, they are not suitable as thickening or gelling agents for organic solvents. Many chemicals of commerce are supplied in an organic solvent medium and it would be desirable in many instances to gel or thicken the organic solvent medium. To illustrate, it would be desirable to gel gasoline such that it could be employed in a thickened or gellike form for use as a fuel. Moreover, it would be desirable to gel gasoline for shipment and storage so as to reduce settling out of the various ingredients contained therein on cooling as would occur when the gasoline is stored in the arctic at subzero temperatures. Although the colloidal cellulose sulfates disclosed in my copending application are suitable in preparing thickened aqueous solutions and thermally reversible aqueous gels, they are not suitable in their present form for thickening organic hydrocarbons or chlorinated hydrocarbons.

An object of the present invention is to provide derivatives of colloidal cellulose sulfates, as disclosed in my prior copending application, which are soluble in many organic solvents.

A further object is to provide a method of preparing novel derivatives of the colloidal cellulose sulfate disclosed in my prior copending application, which derivatives are soluble in organic solvents and may be employed for thickening or gelling the same.

Additional objects of the invention will become apparent on a reading of the following specification and claims.

In accord with my invention, I prepare certain quaternary ammonium salts of a colloidal cellulose sulfate, as described in my prior copending U.S. application Ser. No. 467,738, having a degree of sulfate substitution (D.S.) of at least about 2, e.g., such as 1.8. The reaction is generally conducted by dissolving in water, preferably at a pH of about 7 or higher, a water-soluble salt of the colloidal cellulose sulfate having a D.S. of at least about 2. To the water may be optionally added a lower alcohol, such as methanol, ethanol, or isopropanol, followed by addition of a quaternary ammonium salt. The reaction may be conducted at room temperature or higher temperatures such as about 50° to 70° C. and preferably with agitation of the reaction mixture. The reaction goes almost instantaneously to give a nearly quantitative yield of the quanternary ammonium derivative of the colloidal cellulose sulfate. The product precipitates from the mother liquor and is removed therefrom through filtration, decantation, or other equivalent means, and is then washed, and dried.

The quaternary ammonium salt which is employed for reaction with the cellulose sulfate contains four organic radicals attached to the nitrogen atom. The number of carbon atoms present in the substituent groups attached to the nitrogen atom must be sufficient to impart solubility in organic solvents to the resulting quaternary ammonium salt of the colloidal cellulose sulfate. In general, it has been found that the number of carbon atoms present in all of the organic substituent groups should total about 16 or more in order to impart suitable solubility characteristics to the resulting quaternary ammonium salt of the cellulose sulfate.

Preferably, the organic substituent groups in the quanternary ammonium salt are aliphatic in nature, although aromatic groups may likewise be present. Further, it has been found that the organic substituent groups in the quaternary ammonium salt may be saturated or unsaturated. The preferred substituent groups in the quaternary ammonium salt atom are aliphatic groups derived from long chain fatty acids. Illustrative of such groups are linolyl, stearyl, sorbyl, palmityl, oleyl, lauryl, linoleyl, capryl, caprylyl, myristyl, pelargonal, undecyl, dodecyl, and the like.

As stated previously, the reaction is conducted in the presence of water and optionally a lower alcohol. A preferred lower alcohol is methanol since it is quite miscible with water and is cheap and readily available.

The reaction which takes place according to my invention can be depicted by way of the following general reaction scheme:

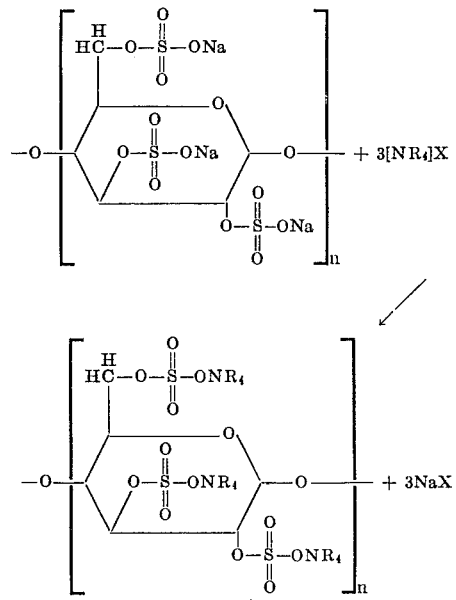

The above reaction scheme is idealized because it depicts reaction of a unit of sodium cellulose sulfate having a D.S. of 3, which is the maximum possible D.S., with 3 moles of a quaternary ammonium halide salt. As stated previously, four radicals (R) are attached to the quanternary ammonium nitrogen atom. The total number of carbon atoms contributed to the quaternary ammonium nitrogen atom by the four R groups is about 16 or more. During the course of the reaction, the quaternary ammonium ion is substituted for the sodium or other suitable ion such as $NH_4$, lithium, potassium, and the like which is present in the substantially undegraded colloidal cellulose sulfate starting material. The nature of the ion, such as sodium, originally present in the cellulose sulfate starting material can, of course, be varied so long as the cellulose sulfate salt which is employed is water soluble. The integer $n$ in the above reaction is a large whole number characteristic of the relatively undegraded cellulose sulfate having colloidal properties which is employed as a reactant, and X is a halogen ion such as chloride, bromide, or iodide.

It should be understood that the cellulose sulfate starting material may be employed in the form of the free sulfuric acid ester rather than in the form of a water-soluble salt thereof. In this case, the quaternary ammonium ion is supplied by use of a quaternary ammonium hydroxide as a reactant. Further, it should be understood that the colloidal substantially undegraded cellulose sulfate employed as the starting material in my process need only have a D.S. of about 2. D.S. figures are, of course, based on the average substitution of sulfate groups in each unit of the cellulose chain. Thus, certain of the cellulose units may be substituted with three sulfate groups as in the above reaction scheme. Conversely, certain other of the cellulose units may only be substituted with one sulfate group while still giving an average D.S. for the cellulose of about 2 or more. In the reaction, at least about a stoichiometric amount or greater of the quaternary ammonium salt or the quaternary ammonium base is employed.

If desired, the quaternary ammonium salt or quaternary ammonium base may be employed in slight excess, e.g., a molar excess of 0.1 to 0.3, or greater in order to drive the reaction to essential completion. This is desirable because the cellulose sulfate is the more expensive reactant. As a practical matter, the completion of the reaction can be readily determined by visual observation of the mother liquor. As the quaternary ammonium cellulose sulfate product is formed, it coagulates and leaves the solution such that the remaining mother liquor becomes nearly clear and loses that portion of its viscosity which was contributed to it by the cellulose sulfate reactant.

The use of a slight molar excess of the quaternary ammonium reactant, e.g., 0.1 to 0.3, has been found to improve the solubility characteristics of the resulting products in aliphatic, aromatic, and chlorinated solvents. While not being bound by any theory, it is believed that an excess of quaternary ammonium ions displaces the sodium or, generally, alkali ions more completely than stoichiometric quantity does. This being the case, the slight excess of quaternary ammonium ions can be removed from the product by excessive washing with alcohol or water which should generally be avoided in preparation of my products.

As described in my copending U.S. patent application Ser. No. 467,738 the essentially undegraded colloidal cellulose sulfates employed in the present invention are formed by reaction of the cellulose with a complex of sulfur trioxide and a lower N-dialkyl amide. The cellulose is preferably admixed or diluted prior to the sulfation reaction through the addition of at least an equal weight of the same lower N-dialkyl amide. Preferably, the N-dialkyl amide is dimethyl formamide, although I may also use diethyl formamide, dimethyl acetamide, diethyl acetamide, and dimethyl propionamide. An excess of the N-dialkyl amide is preferably present in the sulfation complex in addition to the amide which is present by premixing of the cellulose with at least an equal amount by weight of the N-dialkyl amide used in preparing the complex.

In the formation of the essentially undegraded colloidal cellulose sulfate employed in the present invention, the sulfation complex containing sulfur trioxide and an N-dialkyl amide at a weight ratio of about 1 to 1, should be present in the reaction mixture in an amount of about one to eight times the weight of the cellulose. Larger amounts are not precluded, but in general, it is desirable to use an amount of such complex which is at least two times and preferably four to six times the weight of the cellulose. The term cellulose includes cellulose derived from various sources and in various forms such as chemically treated cotton linters, cellulose derived from wood, etc.

In general, a reaction temperature of 0° to 25° C. for the sulfation is suitable, and preferably the sulfation reaction is conducted below 15° C. The reaction time for relatively complete esterification can range up to several hours depending upon the reaction temperature and the relative concentrations of the reactants. The degree of substitution (D.S.) of the essentially undegraded colloidal cellulose sulfates employed in the present invention was established by refluxing a 0.5-gram sample of the cellulose sulfate or 12 hours with 50 cc. of a 10 percent hydrochloric acid solution. The sulfuric acid produced therefrom was precipitated as barium sulfate by the addition of barium chloride. The barium sulfate was weighed and the D.S. was calculated from the weight of the barium sulfate.

To further illustrate the scope of my invention, there are presented the following examples in which all parts and percentages are by weight unless otherwise indicated

EXAMPLE I

Twenty grams of a substantially undegraded colloidal sodium cellulose sulfate, prepared as previously described, and having a D.S. of about 2.5 was dissolved in about 1 liter of distilled water. After diluting the mixture through the addition of 220 to 250 milliliters of methanol, 100 grams of di[oleyl-linoleyl] dimethyl ammonium chloride was added slowly with vigorous agitation. The quaternary ammonium salt was supplied by General Mills Company as Aliquat 215. The Aliquat 215 was diluted with about one volume of methanol prior to addition to the reaction mixture. On completion of the reaction at room temperature, the waxy precipitated product was kneaded in the mother liquor, removed therefrom by decantation of the mother liquor and washed thoroughly in distilled water. The washed product was then wormed or pressed into thin sheets and dried. The yield of the di[oleyl-linoleyl] dimethyl ammonium cellulose sulfate was about 80 grams.

When example I was repeated using a different dimethyl diunsaturated alkyl ammonium chloride (Arquad 2S-75 supplied by Armour Industrial Chemical Co.), a satisfactory yield of the substituted ammonium cellulose sulfate was obtained.

EXAMPLE II

Example I was repeated with the exception that 65 grams of tricaprylyl monomethyl ammonium chloride (Aliquat 336—General Mills Company) was used in lieu of the Aliquat 215. The yield of tricaprylyl monomethyl ammonium cellulose sulfate was about 70 grams.

EXAMPLE III

A number of additional experiments were conducted using the same reaction conditions as set forth in example I. In these reactions, 20 grams of an essentially undegraded colloidal sodium cellulose sulfate, prepared in the manner previously described, and having a D.S. of about 2.5 was in each case reacted with a quaternary ammonium chloride salt as indicated in the first column of the following table. The quantity of the quaternary ammonium chloride employed, including any solvent present with it, is shown in grams in the second column of the table. The yield of the resulting quanternary ammonium cellulose sulfate product is set forth in grams in the third column of the table.

TABLE I

| Quaternary Ammonium chloride | Ammonium Reactant (grams) | Yield of Product (grams) |
| --- | --- | --- |
| A. 50% (wt.) dispersion of oleyl-linoleyl trimethyl ammonium chloride. | 82 | 52 |
| B. 75% (wt.) dispersion of distearyl dimethyl ammonium chloride | 100 | 72 |
| C. 75% (wt.) dispersion of dilauryl dimethyl ammonium chloride | 63 | 58 |
| D. 50% (wt.) dispersion of monostearyl trimethyl ammonium chloride | 81 | 53 |
| E. 25% (wt.) dispersion of stearyl dimethyl benzyl ammonium chloride | 200 | 46 |

The quaternary ammonium salt dispersions shown as (A), (B), (C) and (D) in the above table are supplied as Aliquat 15, Aliquat 207, Aliquat 204, and Aliquat 7 by General Mills Company. The quaternary ammonium chloride dispersion denoted above as (E) is supplied as Triton X–400, by Rohm and Hass Company.

The various products described in the foregoing examples are soluble or highly swellable in hydrocarbon solvents such as benzene, toluene, xylene, petroleum ethers (gasoline), kerosene, mineral oil, and the like, and in chlorinated hydrocarbons such as carbon tetrachloride, chlorobenzene and chloroform. Of the various products described above, those of example I exhibit the best solubility. The di[oleyl-linoleyl] dimethyl ammonium cellulose sulfate and the product made with Arquat 2S–75 formed clear, smooth solutions with all of the above solvents.

The distearyl dimethyl ammonium cellulose sulfate, described in the above table, formed clear solutions in aromatic hydrocarbons and in aliphatic hydrocarbons, the product swelled slightly. If predissolved in benzene, gels were obtained on the addition of petroleum ether or kerosene.

In general, it was found that the solubility of the products obtained according to my invention increases somewhat as the number of carbon atoms in the substituent groups of the quaternary ammonium groups is increased. It was found that the presence of unsaturated substituent groups, as exemplified by those of the above products containing oleyl or linoleyl groupings were somewhat more soluble in hydrocarbons than similar products in which the constituent groups on the quaternary ammonium nitrogen atom were saturated.

Preferred products of my invention are (I) quaternary ammonium cellulose sulfates in which there are two long chain, i.e., from about C12 to about C18, alkyl groups attached to the nitrogen atom along with two methyl groups. Examples of such compounds are dimethyl dilauryl ammonium cellulose sulfate, and compounds containing mixed long chain alkyl groups such as dimethyl di(mixed palmityl, myristyl and stearyl) ammonium cellulose sulfate which may also be called dimethyl di(hydrogenated tallow) ammonium cellulose sulfate. Still another example of a di(mixed alkyl) dimethyl ammonium cellulose sulfate is dimethyl di(tallow) ammonium cellulose sulfate in which the mixed long chain alkyl groups contain some degree of unsaturation.

In general, my compounds in which the ammonium group contains two methyl groups and two long chain alkyl groups, i.e., about $C_{12}$ to about $C_{18}$, have satisfactory solubility characteristics in aliphatic hydrocarbon solvents such as kerosene, gasoline, diesel oil, petroleum naphtha, petroleum distillates, and mineral oil. Their solubility in aromatic hydrocarbon solvents such as benzene, toluene, xylene, and mixed aromatic solvents is good and these compounds are also soluble in chlorinated hydrocarbon solvents such as chloroform, carbon tetrachloride, tetrachloro ethylene, trichloro ethane, and chlorobenzene.

Another class (II) of my quaternary ammonium cellulose sulfate products are those in which three methyl groups are bonded to the nitrogen atom together with one long chain alkyl group, i.e., about $C_{14}$ to about $C_{18}$. Typical of such products are trimethyl tallow ammonium cellulose sulfate, trimethyl stearyl ammonium cellulose sulfate, and trimethyl tall oil ammonium cellulose sulfate. These products are most soluble in aromatic solvents such as those denoted above, and also in chlorinated hydrocarbon solvents such as those denoted above including also methylene chloride.

Still other categories of my products are (III) dimethyl monoalkyl (about $C_{12}$ to about $C_{18}$) monoaromatic ammonium cellulose sulfates; (IV) diaromatic monoalkyl (about C12 to about C18) methyl ammonium cellulose sulfates, and (V) methyl trialkyl (about C8 to about $C_{18}$) ammonium cellulose sulfates. Exemplary of (III) above is dimethyl phenyl stearyl ammonium cellulose sulfate having, in general, the solubility characteristics of my products in category (II). An example of a product in category (IV) is methyl diphenyl stearyl ammonium cellulose sulfate and a product in category (V) is methyl tricaprylyl ammonium cellulose sulfate. The products in categories (IV) and (V) have the general solubility characteristics of products in category (I). Preferably the aromatic groups in the products of (III) and (IV) above are phenyl groups.

EXAMPLE IV

A solution was formed which contained 9.4 grams (0.05 equivalents) of sodium cellulose sulfate in 650 milliliters of distilled water and the solution was heated to a temperature of 60° C. at a pH of about 9.5. The sodium cellulose sulfate employed had a degree of sulfate substitution of 2.3 and a 1 percent solution of the sodium cellulose sulfate in water at about 25° C. had a viscosity of 310 cps. as measured on a Brookfield Viscometer, Model LVF at 60 r.p.m. The solids content of the sodium cellulose sulfate was 92.4 percent, i.e., the material contained about 7.6 percent by weight of water. The equivalent weight of the sodium cellulose sulfate which was used in determining the molar ratio of the quaternary ammonium chloride reactant to the sodium cellulose sulfate reactant was 173.

A solution was formed which contained 49.0 gram of a mixture containing about 75 percent by weight of dimethyl di(hydrogenated tallow) ammonium chloride (0.065 moles) in isopropyl alcohol (Aliquat H–226 supplied by General Mills Co.) and in addition, 300 milliliters of isopropyl alcohol at 20°–30 C. The isopropyl alcohol solution was then added to the solution of sodium cellulose sulfate with vigorous stirring over a period of about 3–5 minutes. After stirring for an additional 10 minutes, the product, which precipitated during the addition of the isopropyl alcohol solution, was collected, washed with 500 milliliters of water, and then dried at ambient temperature (about 25° C.). The product, dimethyl di(hydrogenated tallow) ammonium cellulose sulfate, was a white, solid material. The yield of the product was 40.5 grams or 95 percent of theory and the molar ratio of the quaternary ammonium chloride reactant to the sodium cellulose sulfate reactant was 1.3 to 1. The product had the solubility characteristics described previously for products of category (I), i.e., good solubility characteristics in aliphatic hydrocarbon solvent, aromatic hydrocarbon solvents, and chlorinated hydrocarbon solvents.

When example IV was repeated using 41.2 grams of the dimethyl di(hydrogenated tallow) ammonium chloride reactant at a mole ratio of 1.1:1 with respect to the sodium cellulose sulfate reactant, 36.4 grams of the dimethyl di(hydrogenated tallow) ammonium cellulose sulfate were obtained (99 percent of theory).

EXAMPLE V

To the aqueous solution of the sodium cellulose sulfate described in example IV was added 49.0 grams of a mixture containing about 75 percent by weight of dimethyl di(hydrogenated tallow) ammonium chloride in isopropyl alcohol (Aliquat H–226), which had previously been mixed with 1,200 milliliters of warm water at a temperature of about 50° C. The addition of the water suspension of the ammonium chloride reactant to the sodium cellulose sulfate solution was made over a period of about 5 minutes. After stirring in the manner of example IV, the product was collected, washed and dried as described in example IV to give a yield of 35.3 grams of dimethyl di(hydrogenated tallow) ammonium cellulose sulfate (83 percent of theory).

EXAMPLE VI

To the sodium cellulose sulfate solution described in example IV was added an isopropyl alcohol solution containing 36.2 grams of a mixture containing about 75 percent by weight of dimethyl dilauryl ammonium chloride (0.065 moles) in isopropyl alcohol (Aliquat 204 supplied by General Mills Company). The molar ratio of the quaternary ammonium chloride reactant with respect to the sodium cellulose sulfate reactant was 1.25:1. The product, dimethyl dilauryl ammonium cellulose sulfate, was collected, washed and dried in the manner described in example IV to give a yield of 30.0 grams of product (92 percent of theory). The solubility characteristics of the product were found to be typical of the characteristics described previously for my products of category (I).

EXAMPLE VII

The same procedure as described in example IV was used with the exception that 50.7 grams of a mixture containing about 75 weight percent of dimethyl distearyl ammonium chloride (0.065 moles) in isopropyl alcohol (Aliquat 207 supplied by General Mills Company) dissolved in 200 milliliters of isopropyl alcohol was used as the quaternary ammonium halide reactant. The molar ratio of the quaternary ammonium halide reactant with respect to the sodium cellulose sulfate reactant was 1.3:1. The dried dimethyl distearyl ammonium cellulose sulfate product was a cream-colored, powdery solid and the weight of product was 37.4 grams (87 percent of theory). The product had the solubility characteristics in various solvents as described previously for my products in category (I).

EXAMPLE VIII

The procedure described in example VII was repeated with the exception that 45.2 grams of a 75 percent by weight mixture of dimethyl distearyl ammonium chloride in isopropyl alcohol dissolved in 200 milliliters of additional isopropyl alcohol was employed as the quaternary ammonium halide reactant. The resulting dimethyl distearyl ammonium cellulose sulfate product was dried and weighed 24.5 grams (89 percent of theory).

EXAMPLE IX

To the sodium cellulose sulfate solution described in example IV was added an isopropyl alcohol solution containing 43.6 grams of a 50 weight percent mixture of trimethyl tallow ammonium chloride in isopropyl alcohol (Aliquat 26 supplied by General Mills Company) to provide about 0.065 moles of the ammonium halide reactant. The molar ratio of the quaternary ammonium halide with respect to the sodium cellulose sulfate reactant was 1.3:1, and the product was recovered in the manner described in example IV. The product, trimethyl tallow ammonium cellulose sulfate, was tan in color and somewhat lumpy in consistency and weighed 23.6 grams (87 percent of theory). The solubility characteristics of the product in various solvents were those described previously for the products of my invention in category (II).

In a further experiment, the procedure of example IX was repeated using 50.3 grams of the 50 percent by weight mixture of trimethyl tallow ammonium chloride in isopropyl alcohol. The molar ratio of ammonium halide to the sodium cellulose sulfate reactant was about 1.5:1. The yield of the trimethyl tallow ammonium cellulose sulfate product was 23.1 grams or 81 percent of theory.

EXAMPLE X

The same procedure as described in example IV was employed with the exception that the quaternary ammonium halide reactant was about a 75 weight percent mixture of diphenyl methyl stearyl ammonium chloride in isopropyl alcohol (Arquad L–2PS supplied by Armour Industrial Chemical Company). 31.0 grams of the Arquad L–2PS (0.050 moles of ammonium halide) was dissolved in 200 milliliters of isopropyl alcohol. The molar ratio of the quaternary ammonium chloride reactant with respect to the sodium cellulose sulfate reactant was 1.0:1 and the diphenyl methyl stearyl ammonium cellulose sulfate product was recovered in the manner described in example IV. The product was light tan in color, having a waxy consistency, and weighed 22.7 grams (78 percent of theory). The solubility properties of the product in various solvents are those described previously for my products in category (IV).

EXAMPLE XI

The procedure described in example X was repeated with the exception that 40.4 grams of the 75 weight percent mixture of diphenyl methyl stearyl ammonium chloride reactant in isopropyl alcohol in 200 milliliters of additional isopropyl alcohol was added to the sodium cellulose sulfate solution. The molar ratio of the quaternary ammonium halide reactant was 1.3:1. The diphenyl methyl stearyl ammonium cellulose sulfate product was recovered in the manner described previously in example IV and weighed 33.6 grams or 94 percent of theory.

When the procedure described above in examples X and XI was repeated using 47.7 grams of Arquad L–2PS at a molar ratio of 1.5:1 of the ammonium halide reactant to the sodium cellulose sulfate reactant, the yield of the diphenyl methyl stearyl ammonium cellulose sulfate product was 41.1 grams, or 100 percent of theory.

EXAMPLE XII

To the sodium cellulose sulfate solution prepared as described in example IV was added 42.2 grams (0.065 moles) of a 75 percent by weight mixture tricaprylyl methyl ammonium chloride in isopropyl alcohol (Aliquat 336 supplied by General Mills Company) dissolved in additional isopropyl alcohol. The molar ratio of the quaternary ammonium halide reactant with respect to the sodium cellulose sulfate reactant was 1.3:1 and the tricaprylyl methyl ammonium cellulose sulfate product was isolated and dried in the manner described in example IV. The yield of product was 34.7 grams or 93 percent of theory. The solubility characteristics of the product in various solvents were found to be those of my products, as described previously, in category (V).

In a number of further experiments, the quaternary ammonium halide reactant in isopropyl alcohol solution was added to an aqueous solution of the sodium cellulose sulfate reactant as described in example IV. The results of these experiments are set forth in the following table II in which the name and trade name designation of the quaternary ammonium reactant is set forth in column 1, the weight of the quaternary halide dispersion is set forth in column 2 and the molar ratio of the quaternary ammonium halide to the sodium cellulose sulfate reactant is set forth in column 3. The yield in grams of the product is set forth in column 4, and the yield in terms of the percent of the theoretical yield is set forth in column 5. The names of the quaternary ammonium cellulose sulfate products are set forth in column 7, and the solubility characteristics of each of the products is indicated in column 6 which sets forth the solubility category of the product, as described previously in this application.

TABLE II.—QUATERNARY AMMONIUM HALIDE

| Name | Weight (gms.) | Mole ratio | Yield (gms.) | Yield (percent) | Solubility category | Name |
|---|---|---|---|---|---|---|
| Dimethyl (di(tallow) ammonium chloride (Ammonyx 2200).[1] | 45.2 | 1.2:1 | 34.0 | 86 | (I) | Dimethyl di(tallow) ammonium cellulose sulfate. |
| Dimethyl di(soya) ammonium chloride (Arquad 2S–75).[1] | 50.7 | 1.3:1 | 36.4 | 84 | (I) | Dimethyl di(soya) ammonium cellulose sulfate. |
| Trimethyl stearyl ammonium chloride (Arquad 18–50).[2] | 45.2 | 1.3:1 | 24.5 | 89 | (II) | Trimethyl stearyl ammonium cellulose sulfate. |
| Trimethyl (hydrogenated tallow) ammonium chloride (Arquad HT–50).[2] | 43.6 | 1.3:1 | 25.2 | 93 | (II) | Trimethyl (hydrogenated tallow) ammonium cellulose sulfate). |
| Trimethyl (tall oil) ammonium chloride (Aliquat | 75 | 2.1:1 | 25.0 | 60 | (II) | Trimethyl (tall oil) ammonium cellulose |

Table II—Continued
TABLE II.—QUATERNARY AMMONIUM HALIDE

| Name | Weight (gms.) | Mole ratio | Yield (gms.) | Yield (percent) | Solubility category | Name |
|---|---|---|---|---|---|---|
| 15).[2] Dimethyl phenyl stearyl ammonium chloride (Arquad L-PS).[2] | 41.3 | 1.1:1 | 27.6 | 97 | (III) | Dimethyl phenyl stearyl ammonium cellulose sulfate. |
| Do. | 45.0 | 1.2:1 | 28.3 | 94 | (III) | Do. |
| Do. | 48.8 | 1.3:1 | 28.6 | 90 | (III) | Do. |
| Methyl tri(mixed capryl and caprylyl) ammonium chloride (Adogen 464).[1] | 42.2 | 1.4:1 | 33.8 | 91 | (V) | Methyl tri(mixed capryl and caprylyl) ammonium cellulose sulfate. |

[1] In the form of a mixture containing about 75 weight percent of the ammonium halide in isopropyl alcohol.
[2] In the form of a mixture containing about 50 weight percent of the ammonium halide in isopropyl alcohol.

The quaternary ammonium halide reactants having the prefix "Aliquat" in the above table were supplied by General Mills Company and those having the prefix "Arquad" were supplied by Armour Industrial Chemical Company. The Adogen 464 was supplied by Ashland Chemical Company and the Ammonyx 2200 was supplied by Onyx Chemical Company.

As described previously, my quaternary ammonium cellulose sulfate products are soluble in various organic solvents. The term "organic solvent" refers, of course, to solvents which are water immiscible and thus, are characterized by the absence of a polar functional group in their structure. A convenient way of defining the term "organic solvent" is to refer to the dielectric constant of the solvent since water and water miscible solvents or those solvents which contain a polar functional group in their structure are characterized by their high dielectric constants. Water, for example, has a dielectric constant of 80.4 at 20° C., while other polar solvents likewise have high dielectric constants, e.g., methyl alcohol with a dielectric constant of 33.6 and dimethyl formamide and acetone with dielectric constants of 37.6 and 21.2, respectively.

By way of definition, dielectric constant is a measure of the polarity of a substance. An electric condenser (two parallel metallic plates suitably connected to a source of electricity) has the ability to store electric charge. The capacity of a condenser, i.e., the amount of charge that can be put on the plates for a given voltage, depends on the material between the plates. The dielectric constant (E) of the substance is defined as the ratio of the condenser's capacity with the substance between the plates to its capacity with a vacuum between them.

My quaternary ammonium cellulose sulfate products, as defined previously, may be grouped into five categories or classes denoted (I), (II), (III), (IV), and (V) according to the substituents present in the quaternary ammonium group. It has been found that the solubility characteristics of my products will differ somewhat depending on the nature of the substituents in the quaternary ammonium group and that my products which fall in the same category or class have similar solubility characteristics.

On the basis of solubility tests performed with my quaternary ammonium cellulose sulfate products, it was found that the various classes of my products were soluble in the various types of organic solvents listed below:

Class I products [dimethyl di(about $C_{12}$ to about $C_{18}$ alkyl) ammonium cellulose sulfates]

Soluble in:

1. Saturated aliphatic and alicyclic hydrocarbon solvents having dielectric constants in the range of about 1.80 to about 2.10;
2. Olefinic hydrocarbon solvents having dielectric constants in the range of about 2.00 to about 2.80;
3. Aromatic hydrocarbon solvents having dielectric constants in the range of about 2.20 to about 2.60, and
4. Chlorinated hydrocarbon solvents having dielectric constants in the range of about 2.00 to about 8.00.

Class II Products [trimethyl mono(about $C_{14}$ to about $C_{18}$) alkylammonium cellulose sulfates]

1. Exhibit only limited solubility or swellability in saturated aliphatic hydrocarbon solvents at ordinary temperatures;
2. Dissolve or are highly swollen in aromatic hydrocarbon solvents having dielectric constants in the range of about 2.20 to about 2.80;
3. Dissolve in olefinic hydrocarbon solvents having dielectric constants in the range of about 2.00 to about 2.80, and
4. Dissolve in chlorinated hydrocarbon solvents having dielectric constants in the range of about 2.40 to about 10.00.

Class III [dimethyl mono(about $C_{12}$ to about $C_{18}$) alkyl monoaromatic ammonium cellulose sulfates]

Solubility characteristics the same as the products in class II.

Class IV [diaromatic mono(about $C_{12}$ to about $C_{18}$) alkyl methyl ammonium cellulose sulfates]

Solubility characteristics the same as the products in class I.

Class V [Methyl tri(about C8 to about C18) alkyl ammonium cellulose sulfates]

Solubility characteristics the same as the products in class I.

The dielectric constants of various organic solvents, as employed to determine the solubility characteristics are set forth below, together with the source of the information:

DIELECTRIC CONSTANTS OF SOLVENTS AT 20° C.

Handbook of Chemistry and Physics, R. C. Weast, ed., 49th edition, The Chemical Rubber Company, 1968. p. E-59

| Saturated aliphatic and alicyclic hydrocarbons | | Olefinic hydrocarbons | | Aromatic hydrocarbons | |
|---|---|---|---|---|---|
| Pentane | 1.84 | 1-pentene | 2.10 | Benzene | 2.28 |
| Hexane | 1.89 | 1-heptene | 2.05 | Toluene | 2.38 |
| Octane | 1.95 | 2-methylbutene | 2.20 | o-Xylene | 2.57 |
| Nonane | 1.97 | d-Pinene | 2.64 | m-Xylene | 2.37 |
| Decane | 1.99 | 1-pinene | 2.76 | p-Xylene | 2.27 |
| Undecane | 2.00 | d-Camphene | 2.33 | 1,3,5-trimethylbenzene. | 2.27 |
| Dodecane | 2.01 | dl-Limonene | 2.30 | Ethylbenzene | 2.41 |
| 2,2,3-trimethylpentane | 1.96 | Pentadiene | 2.32 | Isopropylbenzene | 2.38 |
| 2,2,4-trimethylpentane | 1.94 | Isoprene | 2.10 | Naphthalene | 2.54 |
| 2-methylbutane | 1.84 | Cyclohexene | 2.22 | Diphenyl | 2.53 |
| Cyclopentane | 1.96 | | | Styrene | 2.43 |
| Cyclohexane | 2.02 | | | | |
| Chlorinated solvents: | | | | | |
| Carbon tetrachloride | 2.38 | | | | |
| Chloroform | 4.81 | (25° C. Du Pont technical bulletin) [1] | | | |
| 1,1,1-trichloroethane | 7.00 | | | | |
| Vinyl chloride | 6.26 | | | | |
| cis-Dichloroethylene | 9.20 | | | | |
| trans-Dichlorethylene | 2.14 | | | | |

Table —Continued

DIELECTRIC CONSTANTS OF SOLVENTS AT 20° C.

Handbook of Chemistry and Physics, R. C. Weast, ed., 49th edition, The Chemical Rubber Company, 1968. p. E-59

| Saturated aliphatic and alicyclic hydrocarbons | | Olefinic hydrocarbons | Aromatic hydrocarbons |
|---|---|---|---|
| Trichloroethylene | 3.42 | | |
| Tetrachloroethylene | 2.35 | (16° C., Kirk-Othmer vol. 5) [2] | |
| Chlorobenzene | 5.71 | | |
| o-Dichlorobenezene | 9.93 | | |
| m-Dichlorobenzene | 5.04 | | |
| p-Dichlorobenzene | 2.41 | | |
| o-Chlorotoluene | 4.45 | | |
| m-Chlorotoluene | 5.55 | | |
| p-Chlorotoluene | 6.08 | | |
| αChlorotoluene | 7.00 | | |
| Chloroprene | 4.90 | (27° C. Kirk-Othmer, vol. 5) [2] | |
| Dichloromethane | 9.08 | | |

[1] E. I. du Pont de Nemours & Co., Inc., Electrochemicals Dept., Technical Bulletin A 49823, "Properties and Uses of Chlorinated Hydrocarbon Solvents."
[2] Kirk-Othmer Encyclopedia of Chemical Technology, 2d ed., Wiley, New York, N.Y., 1964.

It will be appreciated that organic solvents are frequently mixtures rather than pure materials. My products, of course, may be used to thicken mixed organic solvents which are immiscible with water, such as petroleum distillates. An organic solvent, which is thickened by the addition thereto of one or a mixture of my products, is a liquid which dissolves my quaternary ammonium cellulose sulfate to some extent. Initially, the solvent swells the particles of my quaternary ammonium cellulose sulfate and this is followed by at least partial disappearance of the discrete solid particles initially present. As evidence that the quaternary ammonium cellulose sulfate has gone into solution in the solvent, there is an increase in the viscosity of the solvent. The increase in the viscosity of the solvent provides a convenient means for both selecting and defining suitable water-immiscible organic solvents for use in my invention in conjunction with a quaternary ammonium cellulose sulfate of my invention. A suitable solvent medium is one whose viscosity is increased at least about 20 cps. on the addition thereto of a quaternary ammonium cellulose sulfate of my invention at a concentration of five percent by weight, as measured with a Brookfield Viscometer, Model LVF, using the appropriate spindle for the particular viscosity, using a spindle rotation of 60 r.p.m. at a temperature of 25° C. The temperature of the organic solvent may be increased, if desired, to facilitate the solution of the quaternary ammonium cellulose sulfate and also the organic solvent may be agitated to facilitate solution. The extent to which the viscosity is increased will depend upon the nature of the quaternary ammonium ion and on the viscosity of the water-soluble cellulose sulfate salt used as a raw material. An increase in the viscosity of the sodium cellulose sulfate, measured as a 1 percent solution in water, will result in a corresponding increase in the thickening efficiency of the quaternary ammonium cellulose sulfate. In general, the quaternary ammonium cellulose sulfate may be put into solution in the organic solvent at temperatures ranging from about 20° to about 100° C.; however, as stated above, the resulting viscosity increase is measured at a temperature of 25° C.

Cellulose sulfate salts were also prepared from secondary or tertiary amines or their ammonium halide salts. The number of carbon atoms present in the secondary or tertiary amine or the corresponding ammonium halide salt should total about 16 or more, as described previously in this application.

The resulting secondary and tertiary ammonium salts of a colloidal, essentially undegraded cellulose sulfate having a D.S. of at least about 2, were generally inferior in their properties as compared with the quaternary ammonium salts of the present invention and were generally more difficult to dissolve in organic solvents. They formed hazy, and, in some cases, gelatinous or slightly grainy solutions. Although generally inferior to the products of the present invention, these secondary and tertiary ammonium cellulose sulfate salts may be employed in applications where haze and the time required for solution are of less importance. Illustrative of secondary and tertiary amines used in formation of the above described cellulose sulfate salts are di(hydrogenated tallow) amine, dicoco amine, trilauryl amine, tricaprylyl amine, di(hydrogenated tallow) monomethyl amine, tri(hydrogenated tallow) amine, etc.

To illustrate the utility of my products, four parts of di[oleyl-linoleyl] dimethyl ammonium cellulose sulfate, as described in example I, were dissolved in 96 parts of kerosene, to give a thickened kerosene having a viscosity of 2,800 cps. This material was found useful as a thickened solvent for the removal of grease from metallic surfaces as in the cleaning of motors, engines, and the like.

My products in classes I and IV, above, have also been found soluble in 1,2-dichlorobenzene which has a dielectric constant in excess of 9.00. As an example, dimethyl di(hydrogenated tallow) ammonium cellulose sulfate and diphenyl methyl stearyl ammonium cellulose sulfate are soluble in this solvent. This is an exception to the general solubility of my products in classes I and IV.

I claim:

1. A quaternary ammonium salt of an essentially undegraded cellulose sulfate having a D.S. of at least about 2.0, said cellulose sulfate having a viscosity in excess of 20 cps. at a 1 percent concentration in an aqueous media as measured by a Brookfield Synchro Electric Viscometer Model LVF at 60 r.p.m. at a temperature of 25° C., said cellulose sulfate being further characterized as reactive with potassium ions in aqueous media to form a thermoreversible gel, the quaternary ammonium ion of said salt containing two methyl groups and two long chain alkyl groups, each of said alkyl groups containing from about 12 to about 18 carbon atoms.

2. The product of claim 1 wherein said quaternary ion is dimethyl di(hydrogenated tallow) ammonium.

3. The product of claim 1 wherein said quaternary ion is dimethyl di(tallow) ammonium.

4. The product of claim 1 wherein said quaternary ion is dimethyl di(soya) ammonium.

5. The product of claim 1 containing a molar excess of said quaternary ammonium ion in an effective amount sufficient to improve the solubility of the product in aliphatic, aromatic and chlorinated solvents.

6. The product of claim 5 wherein said molar excess of said quaternary ammonium ion is about 0.1 to about 0.3.

7. A quaternary ammonium salt of an essentially undegraded colloidal cellulose sulfate having a D.S. of at least about 2.0, said cellulose sulfate having a viscosity in excess of 20 cps. at a 1 percent concentration in an aqueous media, as measured by a Brookfield Synchro Electric Viscometer, Model LVF, at 60 r.p.m. at a temperature of 25° C., said cellulose sulfate being further characterized as reactive with potassium ions in aqueous media to form a thermoreversible gel, the quaternary ammonium ion of said salt containing three methyl groups and one long chain alkyl group having from about 14 to about 18 carbon atoms.

8. The product of claim 7 wherein said quaternary ion trimethyl tallow ammonium.

9. The product of claim 7 wherein said quaternary ion is trimethyl stearyl ammonium.

10. The product of claim 7 wherein said quaternary ion is trimethyl (hydrogenated tallow) ammonium.

11. The product of claim 7 wherein said quaternary ion is trimethyl (tall oil) ammonium.

12. The product of claim 7 containing a molar excess of said quaternary ammonium ion in an effective amount sufficient to improve the solubility of the product in aliphatic, aromatic and chlorinated solvents.

13. The product of claim 12 wherein said molar excess of said quaternary ammonium ion is about 0.1 to about 0.3.

14. A quaternary ammonium salt of an essentially undegraded colloidal cellulose sulfate having a D.S. of at least about 2, said cellulose sulfate having a viscosity in excess of 20 cps. at a 1 percent concentration in an aqueous media as measured by a Brookfield Synchro Electric Viscometer at 60 r.p.m. and a temperature of 25° C., said cellulose sulfate being further characterized as reactive with potassium ions in aqueous media to form a thermoreversible gel, the quaternary ammonium ion of said salt containing two methyl groups, an aromatic group, and a long chain alkyl group containing from about 12 to about 18 carbon atoms.

15. The products of claim 14 wherein said aromatic group is a phenyl group.

16. The product of claim 15 wherein said quaternary ion is dimethyl phenyl stearyl ammonium.

17. The product of claim 14 containing a molar excess of said quaternary ammonium ion in an effective amount sufficient to improve the solubility of the product in aliphatic, aromatic and chlorinated solvents.

18. The product of claim 17 wherein said molar excess of said quaternary ammonium ion is about 0.1 to about 0.3.

19. A quaternary ammonium salt of an essentially undegraded colloidal cellulose sulfate having a D.S. of at least about 2, said cellulose sulfate having a viscosity in excess of 20 cps. at a 1 percent concentration in an aqueous media as measured by a Brookfield Synchro Electric Viscometer, Model LVF at 60 r.p.m., at a temperature of 25° C., said cellulose sulfate being further characterized as reactive with potassium ions in aqueous media to form a thermoreversible gel, the quaternary ammonium ion of said salt containing two aromatic groups, a methyl group, and a long chain alkyl group having from about 12 to about 18 carbon atoms.

20. The products of claim 19 wherein said aromatic groups are phenyl groups.

21. The product of claim 20 wherein said quaternary ion is diphenyl methyl stearyl ammonium.

22. The product of claim 19 containing a molar excess of said quaternary ammonium ion in an effective amount sufficient to improve the solubility of the product in aliphatic, aromatic and chlorinated solvents.

23. The product of claim 22 wherein said molar excess of said quaternary ammonium ion is about 0.1 to about 0.3.

24. A quaternary ammonium salt of an essentially undegraded cellulose sulfate having a D.S. of at least about 2.0, said cellulose sulfate having a viscosity in excess of 20 cps. at a 1 percent concentration in an aqueous media as measured with a Brookfield Synchro Electric Viscometer, Model LVF, at 60 r.p.m. and a temperature of 25° C., said cellulose sulfate being further characterized as reactive with potassium ions in aqueous media to form a thermoreversible gel, the quaternary ammonium ion of said salt containing one methyl group and three long chain alkyl groups, each of said alkyl groups containing from about eight to about 18 carbon atoms.

25. The product of claim 24 wherein said quaternary ion is methyl tri(mixed capryl and caprylyl) ammonium.

26. The product of claim 24 containing a molar excess of said quaternary ammonium ion in an effective amount sufficient to improve the solubility of the product in aliphatic, aromatic and chlorinated solvents.

27. The product of claim 26 wherein said molar excess of said quaternary ammonium ion is about 0.1 to about 0.3.

28. The di(oleyl-linoleyl) dimethyl ammonium salt of an essentially undegraded colloidal cellulose sulfate having a D.S. of at least 2, said cellulose sulfate having a viscosity in excess of 20 cps. at a 1 percent concentration in an aqueous media as measured by a Brookfield Synchro Electric Viscometer Model LVF at 60 r.p.m. and a temperature of 25° C., said cellulose sulfate being further characterized as reactive with potassium ions in aqueous media to form a thermoreversible gel.

29. The tricaprylyl monomethyl ammonium salt of an essentially undegraded colloidal cellulose sulfate having a D.S. of at least 2, said cellulose sulfate having a viscosity in excess of 20 cps. at a 1 percent concentration in an aqueous media as measured by a Brookfield Synchro Electric Viscometer Model LVF at 60 r.p.m. and a temperature of 25° C., said cellulose sulfate being further characterized as reactive with potassium ions in aqueous media to form a thermoreversible gel.

30. The oleyl-linoleyl trimethyl ammonium salt of an essentially undegraded colloidal cellulose sulfate having a D.S. of at least 2, said cellulose sulfate having a viscosity in excess of 20 cps. at a 1 percent concentration in an aqueous media as measured by a Brookfield Synchro Electric Viscometer Model LVF at 60 r.p.m. and a temperature of 25° C., said cellulose sulfate being further characterized as reactive in aqueous media with potassium ions to form a thermoreversible gel.

31. The distearyl dimethyl ammonium salt of an essentially undegraded colloidal cellulose sulfate having a D.S. of at least 2, said cellulose sulfate having a viscosity in excess of 20 cps. at a 1 percent concentration in an aqueous media as measured by a Brookfield Synchro Electric Viscometer Model LVF at 60 r.p.m. and a temperature of 25° C., said cellulose sulfate being further characterized as reactive in aqueous media with potassium ions to form a thermoreversible gel.

32. The dilauryl dimethyl ammonium salt of an essentially undegraded colloidal cellulose sulfate having a D.S. of at least 2, said cellulose sulfate having a viscosity in excess of 20 cps. at a 1 percent concentration in an aqueous media as measured by a Brookfield Synchro Electric Viscometer Model LVF at 60 r.p.m. and a temperature of 25° C., said cellulose sulfate being further characterized as reactive in aqueous media with potassium ions to form a thermoreversible gel.

33. The monostearyl trimethyl ammonium salt of an essentially undegraded colloidal cellulose sulfate having a D.S. of at least 2, said cellulose sulfate having a viscosity in excess of 20 cps. at a 1 percent concentration in an aqueous media as measured by a Brookfield Synchro Electric Viscometer Model LVF at 60 r.p.m. and a temperature of 25° C., said cellulose sulfate being further characterized as reactive in aqueous media with potassium ions to form a thermoreversible gel.

34. The stearyl dimethyl benzyl ammonium salt of an essentially undegraded colloidal cellulose sulfate having a D.S. of at least 2, said cellulose sulfate having a viscosity in excess of 20 cps. at a 1 percent concentration in an aqueous media as measured by a Brookfield Synchro Electric Viscometer Model LVF at 60 r.p.m. and a temperature of 25° C., said cellulose sulfate being further characterized as reactive in aqueous media with potassium ions to form a thermoreversible gel.

35. A thickened water-immiscible organic liquid solvent containing an amount effective to thicken said solvent of a quaternary ammonium salt of an essentially undegraded cellulose sulfate having a D.S. of at least about 2, as defined in claim 1, said solvent including therein a solvent selected from the group consisting of a saturated aliphatic or alicyclic hydrocarbon solvent having a dielectric constant in the range of about 1.80 to about 2.10, an olefinic hydrocarbon solvent having a dielectric constant in the range of about 2.00 to about 2.80, an aromatic hydrocarbon solvent having a dielectric constant in the range of about 2.20 to about 2.60, a chlorinated hydrocarbon solvent having a dielectric constant in the range of about 2.00 to about 8.00, and mixtures thereof in an amount sufficient to solubilize said quaternary ammonium salt of cellulose sulfate to a sufficient extent to produce an increase in the viscosity of said water-immiscible organic liquid solvent of about 20 cps. as measured with a Brookfield Synchro Electric Viscometer, Model LVF, at 60 r.p.m. and a temperature of 25° C. when said salt is added to said organic liquid solvent at a concentration of 5 percent by weight.

36. The thickened organic liquid solvent of claim 35 wherein said water-immiscible organic liquid solvent is a petroleum distillate.

37. The thickened organic liquid solvent of claim 35 wherein said water-immiscible organic liquid solvent is gasoline.

38. The thickened organic liquid solvent of claim 35 wherein said quaternary ammonium cellulose sulfate salt contains a molar excess of quaternary ammonium ions.

39. The thickened organic liquid solvent of claim 38 wherein said molar excess of quaternary ammonium ions is about 0.1 to about 0.3.

40. The thickened organic water-immiscible liquid solvent of claim 35 wherein the quaternary ammonium ion present in said cellulose sulfate salt is dimethyl di(hydrogenated tallow) ammonium.

41. The thickened organic liquid solvent of claim 40 wherein said water-immiscible organic liquid solvent is a petroleum distillate.

42. The thickened organic liquid solvent of claim 41 wherein said quaternary ammonium cellulose sulfate salt contains a molar excess of dimethyl di(hydrogenated tallow) ammonium ions.

43. The thickened organic liquid solvent of claim 42 wherein said molar excess of dimethyl di(hydrogenated tallow) ammonium ions is about 0.1 to about 0.3.

44. Dichlorobenzene solvent containing an amount effective to thicken said solvent of a quaternary ammonium salt of cellulose sulfate as defined in claim 1.

45. The product of claim 44 wherein said salt is dimethyl di(hydrogenated tallow) ammonium cellulose sulfate.

46. A thickened water-immiscible organic liquid solvent containing an amount effective to thicken said solvent of a quaternary ammonium salt of an essentially undegraded colloidal cellulose sulfate having a D.S. of at least about 2.0 as defined in claim 7, said organic liquid solvent including therein a solvent selected from the group consisting of an olefinic hydrocarbon solvent having a dielectric constant of about 2.00 to about 2.80, an aromatic hydrocarbon solvent having a dielectric constant of about 2.20 to about 2.80, a chlorinated hydrocarbon solvent having a dielectric constant of about 2.40 to about 10.00, and mixtures thereof in an amount sufficient to solubilize said quaternary ammonium salt of cellulose sulfate to a sufficient extent to produce an increase in the viscosity of said water-immiscible organic liquid solvent of about 20 cps. as measured with a Brookfield Synchro Electric Viscometer, Model LVF, at 60 r.p.m. and a temperature of 25° C. when said salt is added to said organic liquid solvent at a concentration of 5 percent by weight.

47. A thickened water-immiscible organic liquid solvent containing an amount effective to thicken said solvent of a quaternary ammonium salt of an essentially undegraded colloidal cellulose sulfate having a D.S. of at least about 2.0 as defined in claim 14, said organic liquid solvent including therein a solvent selected from the group consisting of an olefinic hydrocarbon solvent having a dielectric constant of about 2.00 to about 2.80, an aromatic hydrocarbon solvent having a dielectric constant of about 2.20 to about 2.80, a chlorinated hydrocarbon solvent having a dielectric constant of about 2.40 to about 10.00, and mixtures thereof in an amount sufficient to solubilize said quaternary ammonium salt of cellulose sulfate to a sufficient extent to produce an increase in the viscosity of said water-immiscible organic liquid solvent of about 20 cps. as measured with a Brookfield Synchro Electric Viscometer, Model LVF, at 60 r.p.m. and a temperature of 25° C. when said salt is added to said organic liquid solvent at a concentration of 5 percent by weight.

48. A thickened water-immiscible organic liquid solvent containing an amount effective to thicken said solvent of a quaternary ammonium salt of an essentially undegraded cellulose sulfate having a D.S. of at least about 2, as defined in claim 19, said solvent including therein a solvent selected from the group consisting of a saturated aliphatic or alicyclic hydrocarbon solvent having a dielectric constant in the range of about 1.80 to about 2.10, an olefinic hydrocarbon solvent having a dielectric constant in the range of about 2.00 to about 2.80, an aromatic hydrocarbon solvent having a dielectric constant in the range of about 2.20 to about 2.60, a chlorinated hydrocarbon solvent having a dielectric constant in the range of about 2.00 to about 8.00, and mixtures thereof in an amount sufficient to solubilize said quaternary ammonium salt of cellulose sulfate to a sufficient extent to produce an increase in the viscosity of said water-immiscible organic liquid solvent of about 20 cps. as measured with a Brookfield Synchro Electric Viscometer, Model LVF, at 60 r.p.m. and a temperature of 25° C. when said salt is added to said organic liquid solvent at a concentration of 5 percent by weight.

49. Dichlorobenzene solvent containing an amount effective to thicken said solvent of a quaternary ammonium salt of cellulose sulfate as defined in claim 19.

50. The product of claim 49 wherein said salt is diphenyl methyl stearyl ammonium cellulose sulfate.

51. A thickened water-immiscible organic liquid solvent containing an amount effective to thicken said solvent of a quaternary ammonium salt of an essentially undegraded cellulose sulfate having a D.S. of at least about 2, as defined in claim 34, said solvent including therein a solvent selected from the group consisting of a saturated aliphatic or alicyclic hydrocarbon solvent having a dielectric constant in the range of about 1.80 to about 2.10, an olefinic hydrocarbon solvent having a dielectric constant in the range of about 2.00 to about 2.80, an aromatic hydrocarbon solvent having a dielectric constant in the range of about 2.20 to about 2.60 a chlorinated hydrocarbon solvent having a dielectric constant in the range of about 2.00 to about 8.00, and mixtures thereof in an amount sufficient to solubilize said quaternary ammonium salt of cellulose sulfate to a sufficient extent to produce an increase in the viscosity of said water-immiscible organic liquid solvent of about 20 cps. as measured with a Brookfield Synchro Electric Viscometer, Model LVF, at 60 r.p.m. and a temperature of 25° C. when said salt is added to said organic liquid solvent at a concentration of 5 percent by weight.

\* \* \* \* \*

PO-1050
(5/69)

UNITED STATES PATENT OFFICE
CERTIFICATE OF CORRECTION

Patent No. 3,637,520           Dated April 13, 1972

Inventor(s)  Richard G. Schweiger

It is certified that error appears in the above-identified patent and that said Letters Patent are hereby corrected as shown below:

Page 1, line [73] "Kelso Company" should be --Kelco Company--.

Column 3, line 73 "or" should be --for--.

Signed and sealed this 3rd day of October 1972.

(SEAL)
Attest:

EDWARD M. FLETCHER, JR.　　　　　　　　　　ROBERT GOTTSCHALK
Attesting Officer　　　　　　　　　　　　　Commissioner of Patents